United States Patent [19]

Ische et al.

[11] 4,002,642

[45] Jan. 11, 1977

[54] PROCESS FOR THE PREPARATION OF POLYHALO COPPER PHTHALOCYANINES

[75] Inventors: Friedrich Ische, Naurod, Taunus; Ernst Spietschka, Oberauroff, Taunus, both of Germany

[73] Assignee: Hoechst Aktiengesellschaft, Frankfurt am Main, Germany

[22] Filed: Aug. 15, 1975

[21] Appl. No.: 605,060

[30] Foreign Application Priority Data

Aug. 17, 1974 Germany .......................... 2439600

[52] U.S. Cl. .............................. 260/314.5; 106/22; 106/193 P; 260/13; 260/37 R
[51] Int. Cl.² .......................................... C09B 47/04
[58] Field of Search ................................ 260/314.5

[56] References Cited

UNITED STATES PATENTS

| | | | |
|---|---|---|---|
| 2,469,663 | 5/1949 | Moser | 260/314.5 |
| 3,013,017 | 12/1961 | Luzzi | 260/314.5 |

*Primary Examiner*—John D. Randolph
*Attorney, Agent, or Firm*—Curtis, Morris & Safford

[57] ABSTRACT

Polyhalo copper phthalocyanines are obtained by reacting a di- to tetrahalo phthalic acid or a derivative thereof, if necessary urea, a copper salt, a titanium tetrahalide and a compound capable of forming an addition compound with said titanium tetrahalide. The purification of the so-obtained products is much easier since lower amounts of titanium compounds can be used. The products are useful as pigments.

11 Claims, No Drawings

PROCESS FOR THE PREPARATION OF POLYHALO COPPER PHTHALOCYANINES

The present invention relates to a process for preparing polyhalo copper phthalocyanines.

U.S. Pat. No. 2,549,842 discloses a process for preparing polyhalo phthalocyanine dyes having more than 8 halogen atoms per molecule by reacting halogenated phthalic acids or derivatives thereof with urea, a metal complexing agent and a halide or hydroxy halide of zirconium, titanium, tin, arsenic or antimony as a catalyst. This known process provides a mixture of a polyhalo phthalocyanine dyestuff with the hydrated oxides of zirconium, titanium, tin, arsenic or antimony, that have to be eliminated by treating with sulfuric acid. A drawback of that process is the relatively high amount of catalyst used, which is said to be not much less than 1 mol of catalyst per mol of polyhalo phthalocyanine dyestuff formed. As a function of this amount, correspondingly high amounts of dilute sulfuric acid have to be used to remove the catalyst from the reaction product. In turn, these acidic catalyst solutions have to be worked up to avoid ecological problems, thus involving high costs.

It has now been found that polyhalo phthalocyanines having at least 8 halogen atoms per molecule can be prepared by reacting phthalic acids containing from 2 to 4 chlorine or bromine atoms per molecule, or the anhydrides, imides, amides, nitriles or ammonium salts thereof, optionally under addition of urea, with a copper salt and a mixture of a titanium tetrahalide and a compound capable of forming an addition product with the titanium tetrahalide. As titanium tetrahalides, especially the titanium(IV)-chloride and titanium(IV)-bromide may be used.

Adequate addition components are, for example, sulfuryl chloride, thionyl chloride, phosphorus trichloride, phosphoroxy chloride and phosphorus pentachloride, or other compounds capable of forming addition compounds with titanium-(IV)-halides (cf. Gmelins Handbuch d. anorg. Chemie, 8th edition, Vol. 41, Titan, pages 312 et seq.). It is not necessary to isolate these addition products, but a mixture of titanium-(IV)-halide is used with an excess of the addition component. Surprisingly, the amount of titanium tetrahalide in such a mixture can be reduced to about 0.3 – 0.4 mol per mol of polyhalo copper phthalocyanine formed, without reducing the yield or deteriorating the quality of the dyestuff.

The reaction is advantageously carried out in the presence of an inert solvent, such as nitrobenzene, trichlorobenzene, o-dichlorobenzene or chlorobenzene. As phthalic acid derivatives, for example 3,4-dichlorophthalic acid, 3,5-dichlorophthalic acid, 3,6-dichlorophthalic acid, 4,5-dichlorophthalic acid, 3,4,5-trichlorophthalic acid, tetrachlorophthalic acid, 3,6-dibromophthalic acid, 4,5-dibromophthalic acid, 3,5-dichloro-4-bromo-phthalic acid, 3,4,5-tribromophthalic acid, 4,6-dichloro-3,5-dibromo-phthalic acid, tetrabromophthalic acid, the anhydrides, imides, amides, nitriles or ammonium salts thereof, or mixtures of these compounds may be used. The addition of urea is not necessary when nitrogen-containing starting materials are used.

As copper salts, for example, copper-(II)-sulfate, copper-(I)-chloride, copper-(II)-chloride, copper-(II)-nitrate, mixtures thereof with one another or with copper powder may be used.

Optimum reaction temperatures range from 170° to 210° C, especially from 190° to 200° C. It is recommended to start with a slowly rising temperature, so that the reaction temperature is reached within about 3 to 5 hours, since a rapid increase in temperature would not provide optimum yields. This reaction temperature is then maintained for some time, advantageously for 1 to 4 hours. Depending on the solvent chosen, the reaction takes place under atmospheric pressure or under elevated pressure in an autoclave. The polyhalo copper phthalocyanine is isolated in the usual manner by filtration. The product thus obtained may be purified, for example by dissolving it in concentrated sulfuric acid, and optionally adding a substance such as sodium nitrate, then precipitating the sulfate, for example by diluting its solution with water to reach a sulfuric acid concentration of from 80 to 90 % of $H_2SO_4$.

Since the amount of titanium tetrahalides and therefore also of titanium compounds in the reaction product is reduced, these can be separated from the product using substantially lower amounts of sulfuric acid, thus considerably cutting the costs for the regeneration of the sulfuric acid, necessary for ecological reasons. Thus, for example, the titanium compounds are separated at the same time as the dyestuff is purified by dissolving the reaction product in 100 % sulfuric acid or, if the filter cake contains water, in oleum having a sulfur trioxide concentration as high as to give a 95 – 100 % sulfuric acid together with the water content of the filter cake. By diluting the mixture to a sulfuric acid content of 80 – 90 %, the dyestuff is precipitated as sulfate which is hydrolyzed and isolated by filtration to give a dyestuff which is free of titanium compounds. The sulfuric acid obtained upon filtration has such a high concentration that it can easily be regenerated. After having been converted into a pigment form, for example by grinding them in the presence of water and/or an organic medium, the polyhalo copper phthalocyanines thus obtained are useful for coloring lacquers, plastic material and printing pastes in pure green shades having good fastness properties.

The following Examples illustrate the invention, the parts and percentages being by weight unless stated otherwise.

EXAMPLE 1

140 Parts of urea, 100 parts of tetrachloro phthalic acid anhydride, and 16 parts of copper-(II)-sulfate were heated in 800 parts of trichlorobenzene to a temperature of 85° – 90° C. At this temperature, a mixture of 6 parts of titanium tetrachloride and 20 parts of sulfuryl chloride was added dropwise. The mixture was stirred for 1 hour at 85° – 90° C and then heated to 190° C within 3 hours. Stirring was continued at this temperature for 2 hours, and the mixture was then cooled to 150° C and suction-filtered at this temperature. The filter cake was washed with 50 parts of trichlorobenzene, then with 200 parts of ethanol and finally with 1000 parts of hot water and dried.

99 Parts of hexadecachloro copper phthalocyanine were obtained, which still contained about 3 % of titanium dioxide.

The dyestuff was dissolved in 250 parts of 100 % sulfuric acid, the solution diluted with 28 parts of water, the sulfate formed was suction-filtered, introduced into 300 parts of water, the dyestuff formed was suction-filtered, washed with water and dried to yield 95 parts of hexadecachloro copper phthalocyanine which was free of titanium compounds.

After having been ground in the presence of water and isobutanol, the dyestuff colored lacquers, plastic material or printing pastes in a clear green shade having excellent fastness properties. The sulfuric acid obtained upon filtration was immediately recycled to regeneration.

EXAMPLE 2

80 Parts of tetrachloro phthalic acid anhydride, 32.4 parts of tetrabromo phthalic acid anhydride, 24 parts of copper-(II)-nitrate and 140 parts of urea were heated in 800 parts of nitrobenzene to 80° C for 1 hour. Then a mixture of 9 parts of titanium tetra-bromide and 20 parts of phosphorus trichloride was added. The mixture was stirred for 1 hour at 85° – 90° C, for 1 hour at 130° C, for another hour at 160° C and finally for three more hours at 185° – 190° C. It was then cooled to 100° C, suction-filtered, washed successively with 100 parts of nitrobenzene, 200 parts of isopropanol and 1000 parts of hot water and dried. 110 parts of a mixture of hexadecachloro copper phthalocyanine, hexadecabromo copper phthalocyanine and titanium dioxide were obtained.

The mixture was dissolved in 300 parts of 100 % sulfuric acid, and 10 parts of sodium nitrite were added. The mixture was stirred for 1 hour at 90° – 95° C, then cooled to room temperature and diluted with 33 parts of water. The precipitated sulfate was suction-filtered, washed with 50 parts of 90 % sulfuric acid and introduced into 500 parts of water. After suction-filtration, washing and drying, 100 parts of a dyestuff mixture which was free of titanium compounds were obtained. After grinding in acetone, it colored lacquers, plastic material and printing in pure yellowish green shades of very good color intensity and excellent fastness properties.

EXAMPLE 3

76 Parts of 3,6-dichlorophthalimide, 70 parts of urea, 10 parts of copper-(I)-chloride and 600 parts of trichlorobenzene were heated to 90° C. At this temperature, a mixture of 5 parts of titanium tetrachloride and 10 parts of phosphorus pentachloride was added. The mixture was heated to 190° C within 4 hours and stirred for 2 hours at this temperature. It was then cooled to 150° C and worked up as described in Example 1.

75 Parts of octachloro copper phthalocyanine were obtained, which still contained about 2.5 % of titanium dioxide.

As in Example 1, the dyestuff was freed from titanium dioxide by purifying via its sulfate. 72 Parts of pure octachloro copper-phthalocyanine were obtained, which was ground in water and isopropanol and used to color lacquers, plastic material and printing pastes in greenish blue shades.

EXAMPLE 4

A dyestuff was prepared as in Example 1 using, however instead of a mixture of titanium tetrachloride with sulfuryl chloride, a mixture of 6 parts of titanium tetrachloride with 20 parts of thionyl chloride. The same result as in Example 1 was obtained. The same result was also obtained using 20 parts of phosphoroxy chloride instead of thionyl chloride.

We claim:

1. In a process for the preparation of a polyhalo copper phthalocyanine from a halophthalic acid or a derivative thereof containing no available nitrogen and urea or a derivative of said halophthalic acid containing available nitrogen, a copper salt and a titanium halide, the improvement comprising reacting as a titanium halide an addition compound of a titanium tetrahalide and a compound capable of forming an addition compound with said titanium tetrahalide or, instead of said addition compound, a mixture of its components, said compound capable of forming an addition compound with titanium tetrahalide being selected from the group consisting of thionyl chloride, sulfuryl chloride, phosphorus trichloride, phosphorus oxychloride, phosphorus pentachloride and mixtures thereof.

2. A process as claimed in claim 1, wherein the halophthalic acid is a phthalic acid substituted by 2 to 4 chlorine and/or bromine atoms.

3. A process as claimed in claim 1, wherein the derivative of the halophthalic acid is its anhydride.

4. A process as claimed in claim 1, wherein the derivative of the halophthalic acid containing available nitrogen is its imide, amide, nitrile or ammonium salt.

5. A process as claimed in claim 1, wherein the copper salt is copper(II)sulfate, copper(I)chloride, copper(II)chloride, copper(II)nitrate, a mixture of one or more of said salts or a mixture of one or more of said salts with copper powder.

6. A process as claimed in claim 1, wherein the titanium tetrahalide is the chloride or bromide.

7. A process as claimed in claim 1, wherein the temperature is 170° to 210° C.

8. A process as claimed in claim 1, wherein the temperature is 190° to 200° C.

9. A process as claimed in claim 1, which comprises reacting the starting materials in an enert solvent.

10. A process as claimed in claim 9, wherein the solvent is an aromatic solvent having a boiling point above 210° C.

11. A process as claimed in claim 9, wherein the solvent is nitrobenzene, a chlorobenzene, a dichlorobenzene, a trichlorobenzene or a mixture of one or more of said chlorobenzenes.

* * * * *